US009794056B1

(12) United States Patent
Tamma et al.

(10) Patent No.: US 9,794,056 B1
(45) Date of Patent: Oct. 17, 2017

(54) TONE REJECTION DURING SYNCHRONIZATION IN FREQUENCY SHIFT KEYED MODULATION SYSTEMS

(71) Applicant: FREESCALE SEMICONDUCTOR, INC., Austin, TX (US)

(72) Inventors: Raja V. Tamma, Austin, TX (US); Claudio Rey, Tempe, AZ (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/283,473

(22) Filed: Oct. 3, 2016

(51) Int. Cl.
| H03D 3/00 | (2006.01) |
| H04L 7/00 | (2006.01) |
| H04L 27/14 | (2006.01) |

(52) U.S. Cl.
CPC .......... H04L 7/0041 (2013.01); H04L 7/0079 (2013.01); H04L 27/14 (2013.01)

(58) Field of Classification Search
CPC ............. H04L 27/2675; H04L 27/2662; H04L 2027/0095; H04L 27/2656; H04L 27/266; H04L 27/227; H04L 27/2688; H04L 27/38; H04L 27/2331; H04L 7/042; H04L 25/03292; H04L 27/06; H04L 27/2663; H04L 27/2665; H04L 27/2692; H04L 27/3818
USPC .......................... 375/343, 142, 334, 272, 303
See application file for complete search history.

(56) References Cited

U.S. PATENT DOCUMENTS

| 4,027,264 | A | 5/1977 | Gutleber |
| 6,002,725 | A | 12/1999 | Razzell |
| 7,397,300 | B2 | 7/2008 | Quinlan et al. |
| 7,746,812 | B2 | 6/2010 | Bhukania |
| 8,023,917 | B2 | 9/2011 | Popescu |
| 8,259,862 | B2 | 9/2012 | Peng et al. |
| 8,519,784 | B2 | 8/2013 | Hafuka |
| 2005/0137815 | A1 | 6/2005 | Quinlan et al. |
| 2010/0080112 | A1* | 4/2010 | Bertrand ............ H04L 27/2675 370/208 |
| 2010/0177857 | A1 | 7/2010 | Huttunen et al. |
| 2014/0023164 | A1 | 1/2014 | Oh et al. |

OTHER PUBLICATIONS

U.S. Appl. No. 15/194,608, filed Jun. 28, 2016 entitled "Frequency Shift Keying (FSK) Demodulator and Method Therefor".
Notice of Allowance in U.S. Appl. 15/194,608, Apr. 10, 2017, 24 pages.
Notice of Allowance in U.S. Appl. No. 15/616,583, dated Aug. 3, 2017, 16 pages.

\* cited by examiner

Primary Examiner — Rahel Guarino

(57) ABSTRACT

A method and apparatus for identifying a search window of carrier-frequency-offset-corrected samples in which a first intermediate signal from a demodulator does not exceed a predetermined threshold, convolving a second intermediate signal from the demodulator within the search window with a predefined pattern to provide a convolution result, determining if an absolute peak of the convolution result exceeds a preamble pattern confirmation threshold, in response to the absolute peak of the convolution result exceeding the preamble confirmation threshold, confirming a preamble pattern detection event to provide a confirmed preamble pattern detection event of a confirmed preamble pattern, and receiving a signal including the confirmed preamble pattern to provide a received digital signal extracted from the signal.

20 Claims, 5 Drawing Sheets

TONE REJECTION DURING SYNCHRONIZATION IN FREQUENCY SHIFT KEYED MODULATION SYSTEMS

CROSS-REFERENCE TO RELATED APPLICATION(S)

The present application is related to co-pending U.S. patent application Ser. No. 15/194,608, entitled "FREQUENCY SHIFT KEYING (FSK) DEMODULATOR AND METHOD THEREFOR" filed on Jun. 28, 2016.

BACKGROUND

Field of the Disclosure

The present disclosure relates generally to synchronization of a received signal and more particularly to detection of a preamble of a received signal.

Background of the Disclosure

Communication of a signal or multiple signals over a medium can be performed by modulating a carrier frequency with a signal to be communicated. The modulating signal varies the actual instantaneous frequency being transmitted from the carrier frequency. For communication to occur efficiently, a receiver should be set to the same carrier frequency as the carrier frequency on which a transmitter is transmitting. Thus, a receiver can have a technique for fine-tuning its carrier frequency. However, if a carrier frequency is modulated with a signal that varies slowly, the variation of the carrier frequency can persist long enough that the actual instantaneous frequency can be mistaken as the carrier frequency being modulated by the receiver's technique for fine-tuning the receiver's carrier frequency. Such confusion can cause the modulating signal to appear as a tone or series of tones and can be referred to as tone interference.

One example of tone interference is external tone interference. External tone interference can occur, for example, when a slowly varying modulating signal, such as an FSK signal emitted by a key fob at a very low data rate, appear as a series of tones to a receiver, such as with a Bluetooth Low Energy (BLE) device.

Another example of tone interference is self-tone interference. Self-tone interference can occur, for example, when a long string of 1's or 0's occurring anywhere in a frame delimiter appears like a tone at $\pm f_{dev}$ where $f_{dev}$ is the frequency deviation.

A data transmission can begin, for example, with a preamble having a predetermined, typically simple, pattern, such as alternating different symbols. A receiver can prepare to receive data when it detects the presence of such a preamble. The receiver can use a known reference waveform based on the pattern of the preamble to detect the presence of a preamble. The receiver can adjust its receive frequency using a carrier frequency offset (CFO) estimate to compensate for frequency error between a transmitter and the receiver. However, tone interference can produce high correlations with the reference waveform, e.g., higher than a preamble does, which can result in false preamble detection events and incorrect CFO estimation. Consequently, a subsequent frame delimiter may not be successfully detected. A high degradation in synchronization performance may be observed due to this problem.

Simple methods based on a comparison of correlation values may be inadequate to solve the problem.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

A method and apparatus are provided to improve the preamble detection and synchronization performance of a receiver by distinguishing legitimate preamble detection events from false preamble detection events and discarding false preamble detection events. Improved performance and tone interference tolerance can be provided even in the presence of tone interference. Embodiments may also provide wider network coverage and lower power consumption. Both packet detection and CFO estimation performance in the presence of tone interference can be improved.

Figure 1:
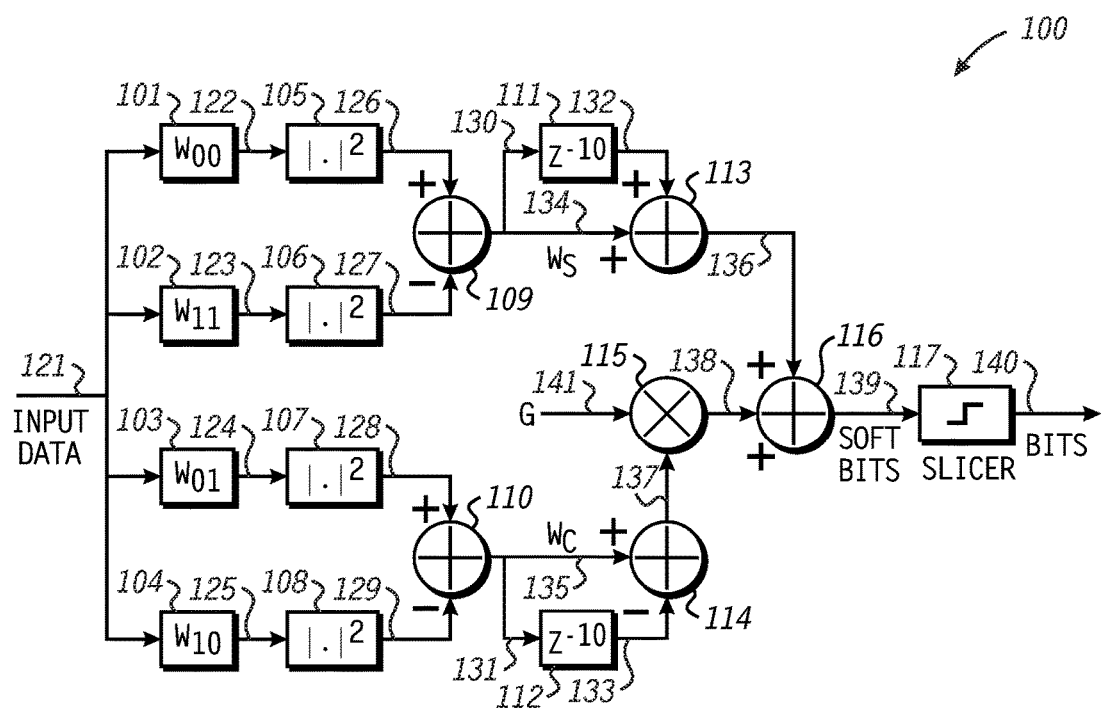
FIG. 1 is a block diagram illustrating a demodulator in accordance with an embodiment.

FIG. 1 is a block diagram illustrating a demodulator in accordance with an embodiment. Demodulator 100 receives at input 121 an analog signal representative of digital information according to modulation of the analog signal. Demodulator 100 includes correlators 101, 102, 103, and 104 to provide pattern matching. Correlator 101, shown with a label $W_{00}$, provides pattern matching for two consecutive symbols at a positive frequency. Correlator 102, shown with a label $W_{11}$, provides pattern matching for two consecutive symbols at a negative frequency. Correlator 103, shown with a label $W_{01}$, provides pattern matching for two consecutive symbols transitioning from a positive frequency to a negative frequency. Correlator 104, shown with a label $W_{10}$, provides pattern matching for two consecutive symbols transitioning from a negative frequency to a positive frequency. Correlators 101, 102, 103, and 104 receive input data via input 121 and provide output signals, respectively, at correlator outputs 122, 123, 124, and 125.

Demodulator 100 includes squaring blocks 105, 106, 107, and 108 to square the absolute values of the output signals of correlators 101, 102, 103, and 104, respectively. Squaring blocks 105, 106, 107, and 108 are respectively coupled to correlator outputs 122, 123, 124, and 125 to receive the correlator output signals.

Demodulator 100 includes difference blocks 109 and 110 to determine differences among outputs of the squaring blocks. Difference block 109 receives, at a non-inverting input 126, a squaring block output signal from squaring block 105. Difference block 109 receives, at an inverting input 127, a squaring block output signal from squaring block 106. Difference block 110 receives, at a non-inverting input 128, a squaring block output signal from squaring block 107. Difference block 110 receives, at an inverting input 129, a squaring block output signal from squaring block 108.

Difference block 109 provides an intermediate output signal $W_s$ at intermediate output 134. Difference block 110 provides an intermediate output signal $W_c$ at intermediate output 135. As intermediate output signal $W_s$ is obtained from correlator 101, with the label $W_{00}$, which provides pattern matching for two consecutive symbols at a positive frequency, and from correlator 102, with the label $W_{11}$, which provides pattern matching for two consecutive symbols at a negative frequency, intermediate output signal $W_s$ is responsive to similar consecutive symbols. As intermediate output signal $W_c$ is obtained from correlator 103, with the label $W_{01}$, which provides pattern matching for two consecutive symbols transitioning from a positive frequency to a negative frequency, and from correlator 104, with the label $W_{10}$, which provides pattern matching for two consecutive symbols transitioning from a negative frequency to a positive frequency, intermediate output signal $W_c$ is responsive to different consecutive symbols.

Thus, intermediate output signal $W_s$ can be referred to as a like-symbol intermediate output signal, and intermediate output signal $W_c$ can be referred to as a different-symbol intermediate output signal. Given the alternating nature of a preamble, being rich in different consecutive symbols with a relative lack of similar consecutive symbols, intermediate output signals $W_s$ and $W_c$ can be used to confirm the presence of a preamble, as will be discussed in more detail with reference to other FIGs. below.

Initial preamble detection by the receiver can be accomplished in various ways. For example, the initial preamble detection can be based purely on correlation of received samples with a reference waveform and then checking whether the correlation value exceeded a threshold. In another embodiment, the initial preamble detection can be based upon the output bits 140 of the demodulator. In either case, because the correlators operate statistically on data provided to them, if the provided data, such as that pertaining to tone interference, shares some characteristics of a legitimate preamble, a strong indication of the detection of a preamble, such as an expected bit sequence at output 140, can occur in absence of a legitimate preamble. By providing a method for figuring out which initial preamble detection events to ignore as false preamble detection events and which to heed as legitimate preamble detection events, the performance of a receiver can be improved. For example, confirming whether a preamble detection event occurred on a real preamble pattern or on a spurious pattern, such as tone, that is inaccurately detected as a preamble pattern, false preamble detection events can be disregarded, allowing a receiver to act only on the legitimate preamble detection events and improving its performance.

Intermediate output signals $W_s$ and $W_c$ are used in a time combining portion of demodulator 100. In the time combining portion, delay block 111 receives intermediate output signal Ws at input 130, and delay block 112 receives intermediate output signal $W_c$ at input 131. Delay block 111 provides a delayed version of intermediate output signal $W_s$ at output 132. Delay block 112 provides a delayed version of intermediate output signal $W_c$ at output 133. Summer 113 receives the delayed version of intermediate output signal $W_s$ at output 132 and the intermediate output signal $W_s$ at intermediate output 134, summing them to provide a summed output signal at output 136. Difference block 114 receives the delayed version of intermediate output signal $W_c$ at output 133 and the intermediate output signal $W_c$ at intermediate output 135, providing a difference output signal at output 137. Gain block 115 receives a gain value at gain input 141 and the difference output signal at output 137 from difference block 114, and multiplies the difference output signal by the gain value to provide an adjusted difference output signal at output 138. Summer 116 receives the summed output signal at output 136 and the adjusted difference output signal at output 138 and sums them to provide a summed output signal at output 139.

Slicer 117 is coupled to output 139 and receives the summed output signal at output 139, which may be thought of as including soft bits representative of binary values but not yet reduced to the binary digits (bits) represented by the soft bits. Thus, output 139 can be referred to as a soft bit output, and the summed output signal at output 139 can be referred to as a soft bit output signal. Slicer 117 translates the soft bits to actual bit values and provides the output bits at bit output 140. According to an embodiment, as mentioned above, the bits at output 140 (bits 140) can be used to make an initial preamble detection, as will be better understood with reference to the FIGs. described below.

Figure 2:
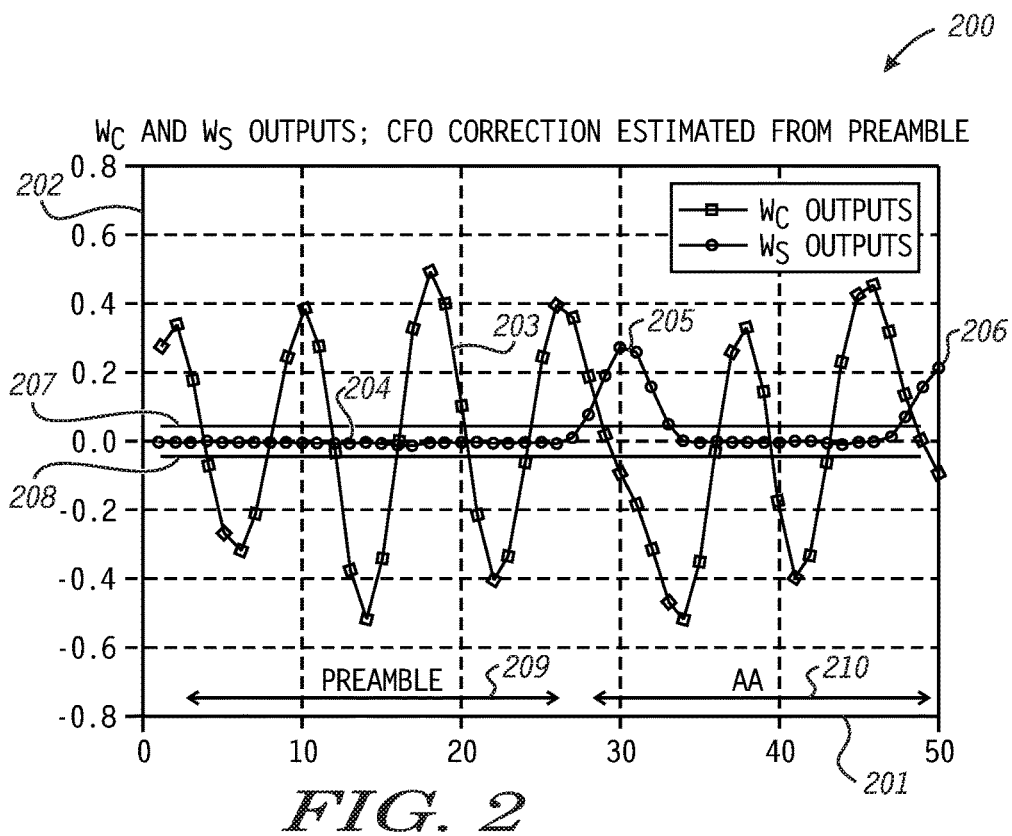
FIG. 2 is a graph illustrating signals at intermediate outputs $W_c$ and $W_s$ of a demodulator for a preamble in accordance with an embodiment.

FIG. 2 is a graph illustrating signals at intermediate outputs $W_c$ 135 and $W_s$ 134 of demodulator 100 for a legitimate preamble in accordance with an embodiment. The legitimate preamble precedes a frame delimiter. While frame delimiters for other types of communication systems may use other terminology, in the examples below, the frame delimiter will be described as an Access Address (AA), consistent with, for example, a Bluetooth Low Energy (BLE) communication system. It should be understood that embodiments may be implemented for communication systems having other types of frame delimiters.

On graph 200, intermediate output signal $W_s$ 204 and intermediate output signal Ws 203, which correspond to signals 134 and 135 of FIG. 1, respectively, for the present embodiment, are plotted with respect to horizontal axis 201, which represents time, and vertical axis 202, which represents amplitude. The time spanned by horizontal axis 201 includes preamble duration 209 of a legitimate preamble, and an Access Address partial duration 210 includes a small portion of the beginning of an Access Address following the legitimate preamble. By virtue of being a legitimate preamble, intermediate output signal $W_s$ 204 remains at a continuously low level over the preamble duration 209, while intermediate output signal $W_c$ 203 swings positively or negatively at every bit transition during duration 209.

The continuously low level of $W_s$ 204 is between an absolute threshold including positive threshold level 207 and negative threshold level 208. At the end of preamble duration 209, as Access Address partial duration 210 begins, intermediate signal $W_s$ 204 rises to a level 205 that exceeds the absolute threshold. After the end of the preamble, during which intermediate signal $W_s$ 204 remained at a continuously low level, intermediate signal $W_s$ 204 can change to a different level one or more times, for example, rising to a level 206 that exceeds the absolute threshold, which can occur during an Access Address duration, such as during Access Address partial duration 210. As a legitimate preamble precedes the Access Address, the patterns of intermediate output signal $W_s$ 204 and intermediate output signal $W_c$ 203 shown in FIG. 2 can be used to recognize and confirm the presence of a legitimate preamble over preamble duration 209, as will be discussed in greater detail below.

Figure 3:
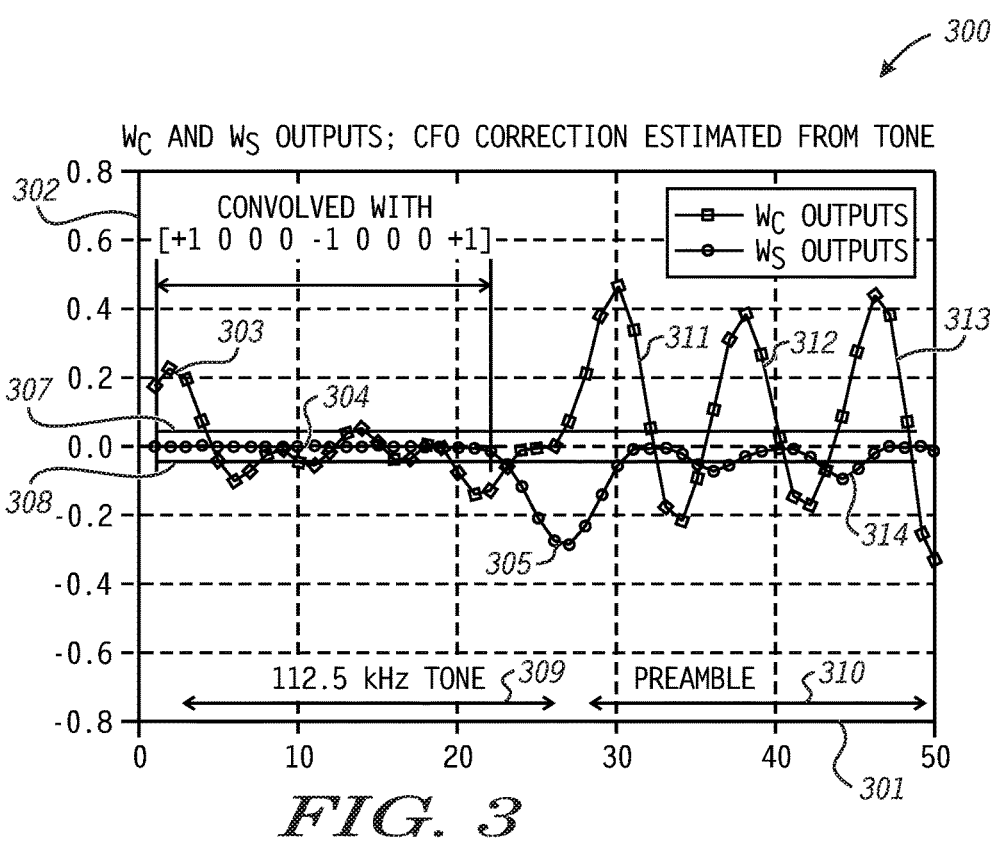
FIG. 3 is a graph illustrating signals at intermediate outputs $W_c$ and $W_s$ of a demodulator for a tone and a preamble-in accordance with an embodiment.

FIG. 3 is a graph illustrating signals at intermediate outputs $W_c$ 135 and $W_s$ 134 of demodulator 100 for a false preamble at duration 309 that precedes a legitimate preamble at duration 310 in accordance with an embodiment. Detection of the false preamble at duration 309 can be due to one or more of the specific tone present during duration 309, an errant CFO, and the like. For purposes of discussion, it is presumed the tone has a frequency of 112.5 kHz. Thus, it will be appreciated that under some circumstances, some form of tone interference can complicate the accurate detection of the preamble. As an example, a slow (e.g., low data rate) frequency shift keyed (FSK) signal preceding a preamble may appear to be a preamble, but since a false preamble is not a legitimate preamble and does not occur at a proper time a false preamble detection can disturb and confuse a receiver from its intended task of receiving legitimate information. Similarly, a false preamble can be detected due to an improper frequency of a transmitter or receiver. For example, it will be appreciated that the CFO frequency, which is corrected during operation of the receiver to correct for any difference between a nominal carrier frequency and an actual carrier frequency of the received signal, may be inaccurate if the receiver adjusts the CFO based upon a false preamble.

As part of an embodiment of a technique for qualifying a detected preamble, samples of intermediate output signal $W_c$ 203 (FIG. 2) in a preamble search window that can be qualified by $W_s$ 204 being below a threshold are convolved with a pattern, such a +1 0 0 0 −1 0 0 0 +1. The result of this convolution can be evaluated to distinguish an actual preamble from tone interference. The pattern used for the convolution can be selected based on the expected preamble pattern and any oversampling rate that may be used. For example, the +1 0 0 0 −1 0 0 0 +1 pattern can be selected for a preamble of alternating symbols (hence the +1, −1, +1 portion of the convolution pattern used for the convolution) with four times oversampling (hence the 0, 0, 0 between the alternating +1 and −1). Other embodiments may use other convolution patterns. For example, a +1 0 0 0 0 0 0 0 −1 0 0 0 0 0 0 0 +1 pattern could be used for eight times oversampling. Thus, if $W_c$ 203, which corresponds to an actual preamble, is convolved with the pattern during duration 209, a result having a relatively large absolute peak value is obtained. If, instead, Similarly, when a false preamble is detected, as with FIG. 3, samples of intermediate output signal $W_c$ 303, which correspond to the false preamble, are convolved with the pattern during duration 309. This convolution can be contingent on $W_s$ 304 remaining below the absolute threshold including positive threshold level 307 and negative threshold level 308, which can be the same values as threshold levels 207 and 208. The result of the convolution can have an absolute peak value that is smaller than that for an actual preamble. Therefore, because the signal associated with a false preamble is a tone or has tone-like properties, such as the relatively slow variation of a low data rate FSK signal that results in false preamble detection, the convolution of $W_c$ can yield an easily distinguishable different result, as discussed in greater detail below with reference to FIGS. 4 and 5.

At the end of tone duration 309, as preamble duration 310 begins, intermediate signal $W_s$ 304 falls to a level 305 that exceeds the absolute threshold by falling below the negative threshold level 308. In a different example, intermediate signal $W_s$ 304 could rise to a level that exceeds the absolute threshold by rising above the positive threshold level 307. Either way, intermediate signal $W_s$ 304 would exceed the absolute threshold. Intermediate output signal $W_c$ 303 is shown as varying greatly, reaching peaks 311, 312, and 313, after tone duration 309 ends and preamble duration 310 begins.

While intermediate signal $W_s$ 304 should ideally remain below the absolute threshold for preamble duration 310, as intermediate signal $W_s$ 204 did for preamble duration 209 of FIG. 2, an unwarranted CFO adjustment resulting from acceptance of a false preamble detection from the tone can cause the receiver to operate off-frequency (tuned to an incorrect frequency different from the frequency at which the receiver should be tuned to receive the preamble). Thus, intermediate signal $W_s$ 304 may vary beyond the absolute threshold at times during preamble duration 310, such as when it falls to level 314 during preamble duration 310. The lesser amount of variation of the convolution of the intermediate output signal $W_c$ 303 with the pattern relative to the greater amount of variation of the same if the tone interference were an actual preamble helps distinguish tone interference from an actual preamble.

By looking for and identifying sustained patterns in the demodulator outputs $W_s$ and $W_c$, the presence and accurate detection of a preamble can be confirmed. During a preamble, $W_s$ is relatively mute, while $W_c$ swings at every bit transition. A rise in $W_s$ value signifies the end of the preamble as illustrated, for example, in FIG. 2, and as described. Convolution of $W_c$ with a predetermined pattern can be used to distinguish an actual preamble detection event from a spurious preamble detection event, such as tone interference giving the impression of a preamble.

A method for providing tone rejection during synchronization in a frequency shift keyed (FSK) modulation system is provided. In accordance with one embodiment, the FSK modulation system may be a continuous phase FSK (CPFSK) modulation system. In accordance with at least one embodiment, the method of providing tone rejection may include a method for confirming a preamble pattern in accordance with an embodiment, as shown, for example, in FIG. 4, followed by a method for determining whether an Access Address endpoint should be changed, or if the value of the CFO should be changed once the preamble pattern has already been confirmed, as shown, for example, in FIG. 5.

Figure 4:
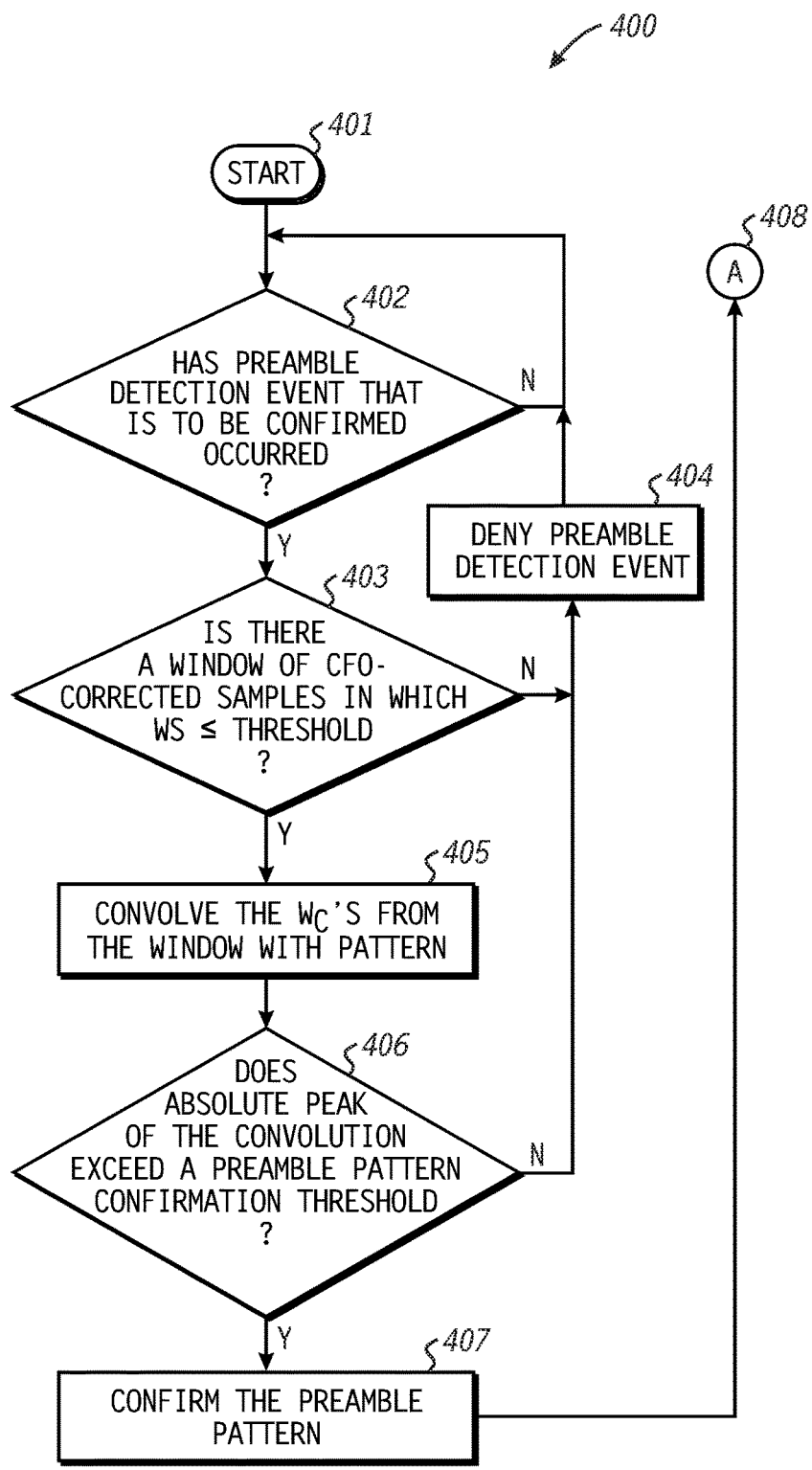
FIG. 4 is a flow diagram of a method for confirming a preamble pattern in accordance with an embodiment.

FIG. 4 is a flow diagram of a method for confirming a preamble pattern in accordance with an embodiment. Method 400 begins at block 401 and proceeds to decision block 402. At decision block 402, method 400 waits for a preamble detection event to occur. The preamble detection event is based on a first criterion. However, while the preamble detection event indicates the possible detection of a preamble, the detection is further verified or disproven as discussed below. From block 402, method 400 continues to decision block 403 when a possible preamble event is detected. Otherwise, method 400 returns to block 402, where the waiting continues.

At block 403, after what appears to be a preamble has been detected, the $W_s$ samples that correspond to the preamble search window are used to make a first preamble verification based on a first criterion. For example, in response to an initial preamble being detected, a sample window corresponding to at least the general region of time over which the detection occurred will be known. The $W_s$ values within this sample window are further evaluated to determine if there is a segment of that window over which the values of $W_s$ are less than or equal than a threshold value. The $W_s$ samples of this segment of time, e.g., window, can be evaluated to determine whether an appropriate number of samples meet the threshold criteria, which, as discussed further below, can be a programmable value.

Referring back to FIGS. 2 and 3, examples of search windows in which intermediate output signal $W_s$ are determined to be less than or equal to an absolute threshold include preamble duration 209 and tone 309. During duration 209 intermediate output signal $W_s$ is within the negative threshold 208 and above positive threshold 207. During duration 309 intermediate output signal $W_s$ is above negative threshold 308 and below positive threshold 307. The preamble duration $_{[TR1]}$209 corresponds to a valid preamble, while the tone duration 309 corresponds to tone interference, which is not a valid preamble.

If no window of CFO-corrected samples in which $W_s$ is less than or equal to a specified threshold can be identified, method 400 continues at block 404, where the validity of the preamble detection event is denied, which can include notifying the receiver 100. From block 404, method 400 returns to decision block 402, where it waits for another preamble detection event to occur. However, if a window of CFO-corrected samples in which $W_s$ is less than or equal to the specified threshold can be identified, such a window is identified, and method 400 continues to block 405.

At block 405, the samples of intermediate output signal $W_e$ in the search window having appropriate $W_s$ values are convolved with a pattern, such as the +1 0 0 0 −1 0 0 0 +1 pattern, which corresponds to the pattern of an expected preamble. From block 405, method 400 continues to decision block 406. At decision block 406, a decision is made as to whether or not an absolute peak of the convolution exceeds a preamble pattern confirmation threshold. If not, method 400 returns to block 404, where the preamble detection event is denied before returning to block 402, where method 400 again waits for a preamble detection event to occur, as the previous preamble detection event could not be confirmed. However, if the absolute peak of the convolution exceeds the preamble pattern confirmation threshold, method 400 continues to block 407. At block 407, method 400 confirms the preamble pattern, thereby allowing the data packet associated with the preamble to be used by the receiver. From block 407, method 400 can continue to reference block 408, denoted by the letter "A," which can lead to reference block 501 of method 500 of FIG. 5, for example, to practice an embodiment in which a larger method includes method 400 and method 500.

Figure 5:
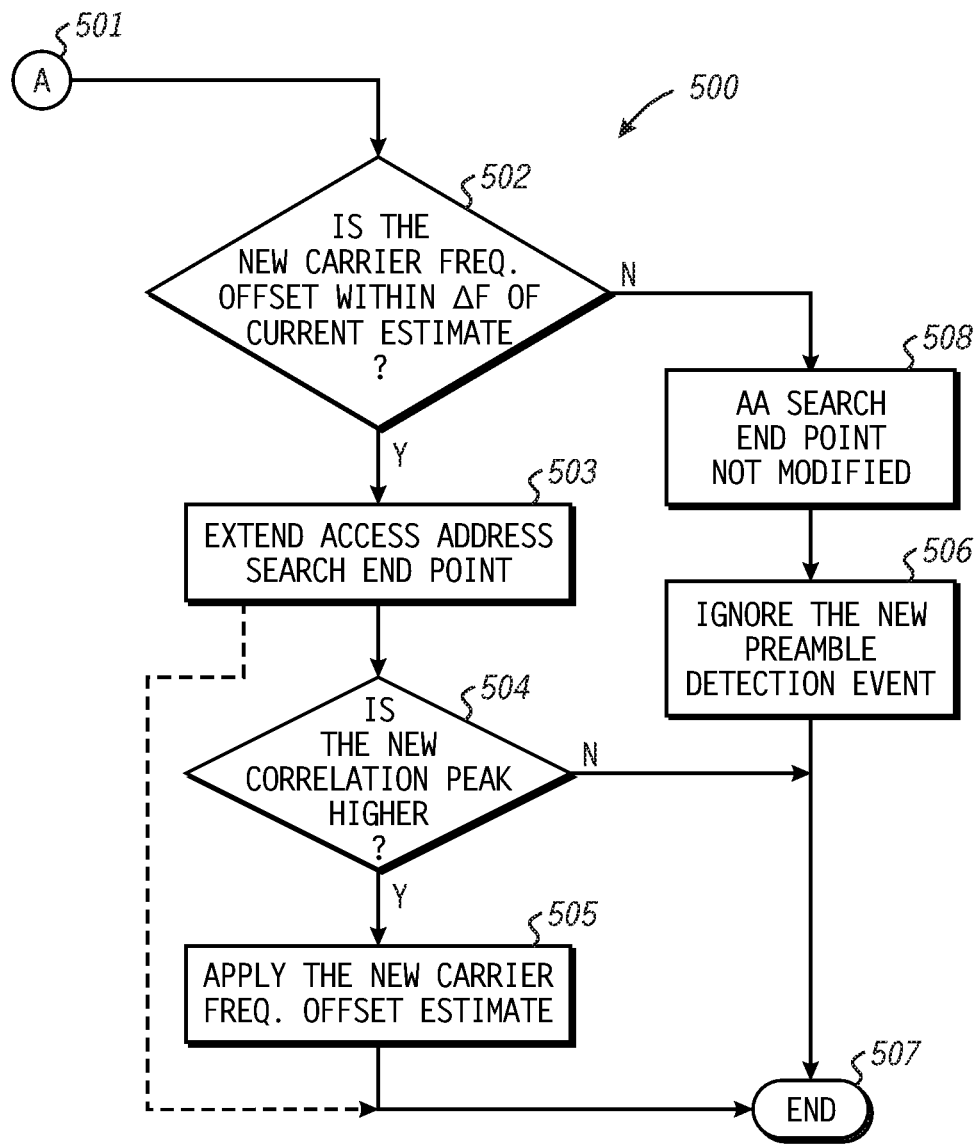
FIG. 5 is flow diagram of a method for processing a subsequent preamble detection event occurring after a preamble pattern has already been confirmed in accordance with an embodiment.

FIG. 5 is flow diagram of a method for processing a subsequent preamble detection event occurring after a preamble pattern has already been confirmed in accordance with an embodiment. Method 500 begins at block 501 and continues to decision block 502. At decision block 502, a decision is made as to whether or not a new carrier frequency offset (CFO) is within a difference value Δf of a current estimate of the carrier frequency. If not, method 500 continues to block 508, where the access address search end point is not modified. From block 508, method 500 continues to block 506, where the new preamble detection event is ignored. From block 506, method 500 continues to block 507, where it ends. Optionally, method 500 can return to waiting for another preamble detection event, for example, by returning to block 401 of method 400 of FIG. 4. One example of a situation where a new CFO that is not within the difference value Δf should be disregarded by proceeding to block 506 can occur when tone interference, for example, self-tone interference, gives an appearance of a carrier frequency being at a new frequency corresponding to the new CFO.

However, if, at decision block 502, the decision is made that the new CFO is within the difference Δf of the current estimate, method 500 continues to block 503. At block 503, the Access Address search end point is extended. Optionally, from block 503, method 500 can continue to block 507, where it ends. Otherwise, from block 503, method 500 continues to decision block 504. At decision block 504, a decision is made as to whether or not the new correlation peak is higher than a previous correlation peak. If not, method 500 continues to block 507, where method 500 ends without applying the new CFO estimate but by instead discarding the new CFO estimate. However, if the new correlation peak is higher, method 500 continues to block 505. At block 505, the new CFO estimate is applied as the CFO to be used for receiving signals. From block 505, method 500 continues to block 507, where it ends.

Figure 6:
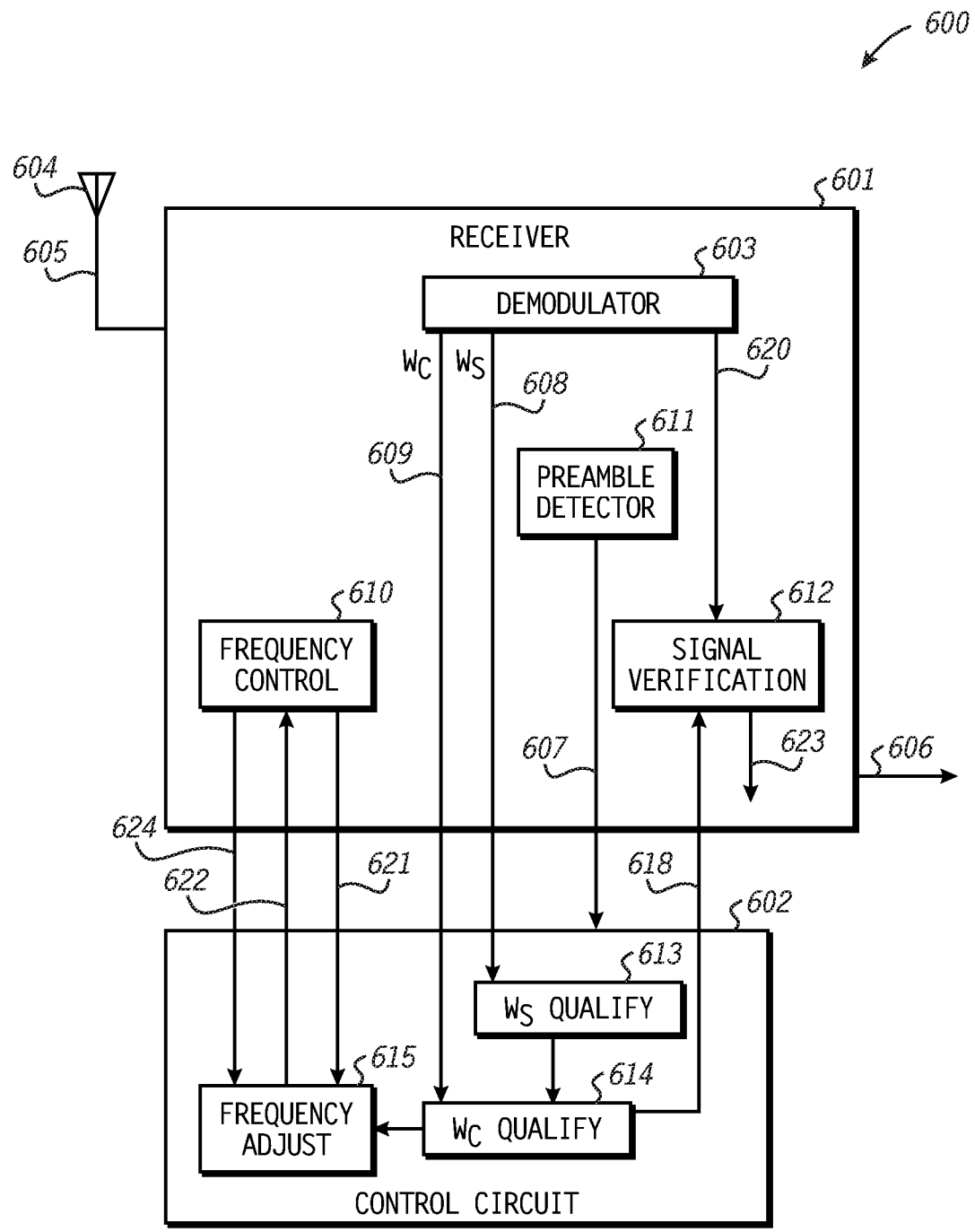
FIG. 6 is a block diagram illustrating a system in accordance with an embodiment.

FIG. 6 is a block diagram illustrating a system in accordance with an embodiment. System 600 includes receiver 601 and control circuit 602. It will be appreciated that the control circuit 602 can be incorporated as part of the receiver 601. A signal is received at antenna 604, which is connected to feedline 605 to provide the signal to receiver 601, to which feedline 605 is connected. Receiver 601 includes demodulator 603, preamble detector 611, signal verification circuit 612, and frequency control circuit 610. Demodulator 603 demodulates the received signal and provides output data at output 606, which is connected to receiver 601. Demodulator 603 can be implemented, for example, as shown in FIG. 1.

Preamble detector 611, which may receive samples from before the demodulator 603, from the output of the demodulator 603, or from an intermediate location of the demodulator 603, as previously discussed, provides a preamble detection event indication to control circuit 602 via interconnect 607 that indicates an initial preamble has been detected. Preamble detector 611 detects the presence of a pattern in the signal from demodulator 603 in response to the bits 140 corresponding to a known pattern of a preamble of a data transmission and provides the preamble detection event indication in response to detecting the presence of the pattern. The signal may, for example, be a signal conveying the output data of the demodulator that is provided to output 606.

Signal verification circuit 612 the bits 140 from demodulator 603 via interconnect 620 and a preamble qualification signal via interconnect 618 from the control circuit 602. In response to the preamble detected by preamble detector 611 being qualified by the control circuitry 602, the signal verification circuit will allow the bits 140 associated with the preamble to be used for further processing by presenting the bits to interconnect 623. Otherwise, if not qualified, it is presumed that the preamble detected by the preamble detector 611 is not valid and the signal verification module will not allow the bits 140 associated with the detected preamble to be processed further. As one example, output 623 may be a gated output data output, allowing valid output data to pass but blocking invalid output data. As another example, output 623 may be a status output signaling whether output data, for example, output data at output 606, is valid or not.

Frequency control circuit 610 controls the frequency of operation of receiver 601. For example, frequency control circuit 610 allows a carrier frequency offset value to be applied to adjust a carrier frequency that receiver 601 is tuned to receive. Frequency control circuit 610 provides a signal representative of a current carrier frequency offset value via interconnect 621 to frequency adjust circuit 615 of control circuit 602, provides a proposed new carrier frequency offset value via interconnect 624 to frequency adjust circuit 615 of control circuit 602, and receives a signal representative of a new carrier frequency offset value via interconnect 622 from frequency adjust circuit 615 of control circuit 602.

Frequency adjust circuit 615 of control circuit 602 receives the signal representative of the current carrier frequency offset value from frequency control circuit 610 via interconnect 621 and a signal representative of a proposed new carrier frequency offset value from frequency control circuit 610 via interconnect 624. Frequency adjust circuit 615 determines, based on whether the proposed new carrier frequency offset value is within a specified amount, ΔF, of the current frequency offset value and based on whether a new correlation peak of a correlator operating at the proposed new carrier frequency offset is higher than a current correlation peak of a correlator operating at the current carrier frequency offset, whether the proposed new carrier frequency offset value should be applied as a new carrier frequency offset estimate value to replace the current carrier frequency offset value.

Demodulator 603 provides intermediate output signals to control circuit 602 via interconnects 608 and 609, with interconnect 608 providing a $W_s$ intermediate output signal to $W_s$ qualify circuit 613 of control circuit 602 and interconnect 609 providing a $W_c$ intermediate output signal to $W_c$ qualify circuit 614 of control circuit 602. Control circuit 602 provides a control signal 608 to receiver 601 to control receiver 601 via interconnect 608.

$W_s$ qualify circuit 613 of control circuit 602 provides a signal via an interconnect to $W_c$ qualify circuit 614 of control circuit 602 to indicate successful qualification of the $W_s$ intermediate output signal, such as an indication that a window of carrier-frequency-offset-corrected samples in which $W_s$ is less than or equal to a specified threshold has been identified. $W_c$ qualify circuit 614 provides a signal via an interconnect to frequency adjust circuit 615, and a signal via interconnect 618 to the signal verification module of the receiver 101 to indicate successful qualification of the $W_c$ intermediate output signal, such as an indication that an absolute peak of a convolution of the $W_c$ values within the identified window with a specified pattern exceeds a preamble pattern confirmation threshold. In response to receiving a qualification indicator at interconnect 617, the frequency adjust module will determine whether to a new carrier frequency offset should be implemented, as described at FIG. 5

As shown in the accompanying drawings and described above, an elegant mechanism can be provided to confirm the presence of a preamble bit pattern by examining the intermediate output signals ($W_s$ and $W_c$) of a symbol demodulator. A symbol demodulator such as that shown in FIG. 1 may be used. As an embodiment may be practiced by adapting existing control portions of a receiver to incorporate a disclosed method, low overhead costs can be achieved. As the method can begin processing a preamble detection event as soon as a suspected preamble ends, fast pattern detection can be provided. In accordance with one embodiment, a first intermediate output signal is distinct from the second intermediate output signal, and the first intermediate output signal is obtained from a different node than the second intermediate output signal. In accordance with another embodiment, a "soft bits" output of a symbol demodulator, such as a summed output signal at output 139 of FIG. 1, may be examined instead of the intermediate output signals, such as intermediate output signals $W_s$ and $W_c$ at intermediate outputs 134 and 135 of FIG. 1. For example, the soft bits output 139 in FIG. 1 can be used as a source of information for an embodiment in which a determination is made as to whether or not the data of the soft bits output 139 match the preamble pattern expected. One way of determining whether there is a match is to correlate the data of the soft bits output 139 with a pattern, such as a [+1, 0, 0, 0, −1, 0, 0, 0, +1, 0, 0, 0, −1, . . . ] pattern for the case of four times oversampling, and to determine whether or not a certain threshold is exceeded. If the threshold is exceeded, a match is determined to exist, and so the preamble detection event is accepted to be legitimate; otherwise, it is not. Note that this does not require identifying any quiet period (absolute values of $W_s$ remaining under a threshold), as described previously above. However, the previously described embodiment may be capable of providing a faster time to a decision because the delay blocks 111 and 112 of FIG. 1 don't delay the data upon which the decision is based.

A method of confirming the presence of a preamble bit pattern can have applicability to a wide range of applications, including, for example, internet-of-things (IoT) and connectivity applications, where the possibly lower data rates of connected "things" may be accommodated by lower data rate communication techniques that may be more likely to pose a potential for tone interference as compared with higher data rate communication techniques. Such IoT and connectivity applications may communicate, for example, using electromagnetic spectral bands in the 2.4 GHz range, the sub-GHz (e.g., hundreds of MHz) range, or in other ranges. However, a method of confirming the presence of a preamble bit pattern can also be applicable to higher data rate communication techniques and can be universally applicable.

An embodiment of a method can begin, after each preamble detection event, by doing the following beginning from the start of the AA search window: identify the window of CFO-corrected samples in which $W_s < \frac{1}{32}$ (this threshold may be programmable); convolve the $W_c$'s from the window with [+1,0,0,0, −1,0,0,0, +1] pattern; if the absolute peak of the convolution exceeds 0.90 (programmable threshold), then a preamble pattern is confirmed; if a preamble detection event occurs after the preamble pattern has already been confirmed, one of the two procedures described below may be used. According to a first procedure, if the new CFO estimate is within Δf of the current estimate, AA search end point is extended. This can accommodate long preambles. Otherwise, the new preamble detection event is simply ignored, and the AA search end point is not modified. According to a second procedure, if the new CFO estimate is within Δf of the current estimate, AA search end point is extended, and, if the new correlation peak is higher, the new CFO estimate is applied thereafter. Otherwise, if the new correlation peak is not higher, the new preamble detection event is simply ignored. Choices between use of the first procedure and the second procedure may be made, for example, based on performance (where the second procedure may excel) and ease of implementation (where the first procedure may excel) or based on other theoretical or practical considerations.

As examples, embodiments may be practiced with respect to communications such as those utilizing an Institute of Electrical and Electronics Engineers (IEEE) 802.15.4 modulation system (including Gaussian frequency shift keying (GFSK) and multi-rate and multi-regional frequency shift keying (MR-FSK) implementations), a Bluetooth Low Energy (BLE) modulation system, a Dynastream Innovations, Inc./ANT Wireless ANT modulation system, or another modulation system. As one more specific example, an embodiment may be practiced for communications having a BLE modulation system using an oversampling ratio of 4.

Modern communications technology allows highly sensitive receivers to be provided. Such high sensitivity can increase range of communications. However, the bandwidth demands of modern communications and the limited spectral bands available for use can result in congestion of the frequency ranges in which communication systems may operate. Such congestion can lead to interference of one system with another. The frequency modulation (FM) capture effect, which occurs when one stronger frequency modulated signal overcomes a weaker signal, can help mitigate interference when the stronger signal is present at the same time as the weaker signal. However, to conserve battery power, a transmitter may not be keyed continuously. During times a transmitter is not keyed, a receiver listening for a transmitted signal from the transmitter may instead receive an undesired weaker signal.

Accordingly, an embodiment may be practiced to help differentiate the content of a desired signal from an undesired signal, allowing the undesired signal to be ignored and the desired signal to be received. Given the possible nature of interference, an embodiment need not necessarily attempt to remove or mitigate the interfering signal but may instead allow the interfering signal to be processed by a receiver but ignored by a control system controlling the provision of meaningful data received by the receiver. Thus, merely distinguishing a desired signal from an interfering signal can be adequate to eliminate the effects of the interfering signal without the use of techniques that involve some form of signal subtraction (e.g., generating and using a cancellation signal) or filtering (e.g., using a bank of notch filters or sub-band filters) to attempt to remove or mitigate the interfering signal. One important point is that preamble detection can actually fail, in a digital sense, in the presence of tone interference, not just be degraded, in an analog sense, and the ability to distinguish a preamble from a tone-like interfering signal can prevent that failure, not just improve, in the analog sense, the otherwise degraded signal. Moreover, attempting to remove a tone-like interfering signal can be counterproductive, for example, in the case of self-tone interference, as the removal may also effectively discard a portion of a desired signal, such as an Access Address component of a desired received signal, which can result in synchronization failure. Thus, an ability to preserve a portion of a signal that may be interpreted as tone-like interference so that it can be accurately received in its proper context (e.g., as an Access Address) while distinguishing and ignoring a spurious preamble portion of the signal resulting from misinterpretation of the portion of the signal as being tone-like interference in an improper context (e.g., while waiting to receive a preamble) can allow accurate reception of a signal, with each portion of the signal being properly interpreted in its proper context in relation to the signal as a whole.

Accordingly, in accordance with at least one embodiment, a technique is provided to reliably distinguish real preambles from tones to prevent false preamble detection events from triggering a frame delimiter search process so that only genuine preamble detection events trigger a frame delimiter search process. Such a technique is capable of providing better frequency correction because legitimate CFO estimates can be obtained and used.

In the foregoing description, the term "at least one of" is used to indicate one or more of a list of elements exists, and, where a single element is listed, the absence of the term "at least one of" does not indicate that it is the "only" such element, unless explicitly stated by inclusion of the word "only" or a similar qualifier.

The concepts of the present disclosure have been described above with reference to specific embodiments. However, one of ordinary skill in the art will appreciate that various modifications and changes can be made without departing from the scope of the present disclosure as set forth in the claims below. In particular, the particular types of circuits used to implement apparatus may be varied according to different embodiments. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
identifying a search window of carrier-frequency-offset-corrected samples in which a first intermediate signal from a demodulator does not exceed a predetermined threshold;
convolving a second intermediate signal, from the demodulator, within the search window with a predefined pattern to provide a convolution result;
in response to an absolute peak of the convolution result exceeding a preamble pattern confirmation threshold, providing a confirmed preamble indicator to confirm detection of a preamble pattern by a receiver; and
providing an extracted digital signal in response to receiving the confirmed preamble indicator.

2. The method of claim 1 further comprising:
determining if a new carrier frequency offset estimate is within a predetermined difference limit from a current carrier frequency offset estimate;
in response to the new carrier frequency offset estimate being within the predetermined difference limit from the current carrier frequency offset estimate, extending an access address search end point.

3. The method of claim 2 further comprising:
in response to a new correlation peak of a new correlation result being higher than a previous correlation peak, applying the new carrier frequency offset estimate for receiving a signal.

4. The method of claim 3 further comprising:
in response to the new correlation peak not being higher than the previous correlation peak, ignoring a new preamble detection event without applying the new carrier frequency offset estimate.

5. The method of claim 1 wherein the predetermined pattern is a +1,0,0,0, −1,0,0,0, +1 pattern.

6. The method of claim 1 wherein the first intermediate output signal is a like-symbol intermediate output signal and the second intermediate output signal is a different-symbol intermediate output signal.

7. The method of claim 1 wherein the first intermediate output signal and the second intermediate output signal are a soft bit output signal.

8. A method comprising:
waiting for a preamble detection event to occur at a receiver;

in response to occurrence of the preamble detection event, identifying a search window of carrier-frequency-offset-corrected samples in which a first intermediate output signal from a demodulator does not exceed a predetermined threshold;
convolving a second intermediate output signal from the demodulator within the search window with a predetermined pattern to provide a convolution result;
in response to an absolute peak of the convolution result exceeding a preamble pattern confirmation threshold, confirming the preamble detection event to provide a confirmed preamble detection event for a confirmed preamble pattern; and
receiving a signal comprising the confirmed preamble pattern to provide a received digital signal extracted from the signal.

9. The method of claim 8 further comprising:
in response to the new carrier frequency offset estimate being within a predetermined difference limit from a current carrier frequency offset estimate, extending an access address search end point.

10. The method of claim 9 further comprising:
determining if a new correlation peak of a new correlation result is higher than a previous correlation peak; and
in response to the new correlation peak being higher than the previous correlation peak, applying the new carrier frequency offset estimate for the receiving the signal.

11. The method of claim 10 further comprising:
in response to the new correlation peak not being higher than the previous correlation peak, ignoring a new preamble detection event without applying the new carrier frequency offset estimate.

12. The method of claim 8 wherein the predetermined pattern is a +1,0,0,0, −1,0,0,0, +1 pattern.

13. The method of claim 8 wherein the first intermediate output signal is a like-symbol intermediate output signal and the second intermediate output signal is a different-symbol intermediate output signal.

14. The method of claim 8 wherein the first intermediate output signal and the second intermediate output signal are a soft bit output signal.

15. A receiver apparatus comprising:
a demodulator comprising an input to receive a modulated signal, a first output to provide a demodulated output, a second output to provide a first intermediate signal of the demodulator, and a third output to provide a second intermediate signal of the demodulator;
a preamble detector coupled to the demodulator to detect an occurrence of a preamble detection event; and
a control circuit comprising
a first preamble qualification module comprising an input coupled to the second output of the demodulator to identify, in response to the control circuit receiving an indication of the preamble detection event, a search window of carrier-frequency-offset-corrected samples for which the first intermediate output signal does not exceed a threshold;
a second preamble qualification module comprising an input and an output,
the input coupled to the third output of the demodulator to convolve the second intermediate output signal within the search window identified by the first qualification module with a predetermined pattern to provide a convolution result;
the output to provide a confirmed preamble indicator in response to an absolute peak of the convolution result exceeding a preamble pattern confirmation threshold; and
wherein the receiver is configured to provide a received digital signal extracted from the signal in response to receiving the confirmed preamble indicator.

16. The apparatus of claim 15 further comprising a frequency adjust module that is configured to, when the confirmed preamble indicator is received and a calculated new carrier frequency offset estimate is within a predetermined difference limit from a current carrier frequency offset estimate, extend an access address search end point.

17. The apparatus of claim 16 wherein the frequency adjust module is further configured to determine if a new correlation peak of a new correlation result is higher than a previous correlation peak, and, in response to the new correlation peak being higher than the previous correlation peak, to apply the new carrier frequency offset estimate for the receiving the signal.

18. The apparatus of claim 17 wherein the control circuit is further configured, in response to the new correlation peak not being higher than the previous correlation peak, to discard the new carrier frequency offset estimate.

19. The apparatus of claim 15 wherein the first intermediate output signal is a like-symbol intermediate output signal and the second intermediate output signal is a different-symbol intermediate output signal.

20. The apparatus of claim 15 wherein the first intermediate output signal and the second intermediate output signal are a soft bit output signal.

* * * * *